United States Patent
Dower

(10) Patent No.: US 7,552,790 B2
(45) Date of Patent: Jun. 30, 2009

(54) THREE WHEELED VEHICLE WITH TILTING MECHANISM

(76) Inventor: James C. Dower, Killadangan, Dungarvan, County Waterford (IE)

( * ) Notice: Subject to any disclaimer, the term of this patent is extended or adjusted under 35 U.S.C. 154(b) by 445 days.

(21) Appl. No.: 11/265,058

(22) Filed: Nov. 1, 2005

(65) Prior Publication Data
US 2006/0086555 A1 Apr. 27, 2006

(30) Foreign Application Priority Data
May 2, 2003 (IE) .................. S2003/0335
May 4, 2004 (WO) ............... PCT/IE2004/000064

(51) Int. Cl.
B62D 61/06 (2006.01)
B62K 5/02 (2006.01)

(52) U.S. Cl. ........................ 180/210; 280/282

(58) Field of Classification Search ............... 74/416, 74/417, 422, 423, 424.6, 473.1, 473.13, 473.3, 74/473.31, 491, 551.1; 180/210, 211, 215, 180/337, 342, 347, 905; 280/266, 282
See application file for complete search history.

(56) References Cited

U.S. PATENT DOCUMENTS

| | | | | |
|---|---|---|---|---|
| 2,788,858 | A | * | 4/1957 | Aasland et. al. ............ 180/210 |
| 3,746,118 | A | * | 7/1973 | Altorfer ....................... 180/210 |
| 4,020,914 | A | * | 5/1977 | Trautwein ................... 180/210 |
| 4,064,957 | A | * | 12/1977 | Parham ....................... 180/215 |
| 4,423,795 | A | * | 1/1984 | Winchell et al. ............ 180/215 |
| 4,424,877 | A | * | 1/1984 | Kawasaki .................... 180/210 |
| 4,429,760 | A | * | 2/1984 | Koizumi et al. ............. 180/215 |
| 4,469,344 | A | * | 9/1984 | Coil ............................ 280/269 |
| 4,572,535 | A | | 2/1986 | Stewart et al. |
| 4,624,469 | A | * | 11/1986 | Bourne, Jr. .................. 280/62 |
| 4,678,053 | A | * | 7/1987 | Watanabe et al. ........... 180/210 |
| 4,789,173 | A | * | 12/1988 | Lofgren et al. ............ 280/288.1 |
| 5,116,069 | A | * | 5/1992 | Miller ...................... 280/5.509 |
| 5,209,506 | A | * | 5/1993 | Klopfenstein ............... 280/240 |
| 5,354,084 | A | * | 10/1994 | Lofgren et al. .............. 280/250 |
| 5,501,478 | A | * | 3/1996 | Doan .......................... 280/282 |
| 5,568,935 | A | * | 10/1996 | Mason ........................ 280/282 |
| 5,730,453 | A | * | 3/1998 | Owsen ........................ 280/282 |
| 5,927,424 | A | | 7/1999 | Van Der Brink et al. |

(Continued)

FOREIGN PATENT DOCUMENTS

GB 2082987 A * 3/1982

*Primary Examiner*—Paul N Dickson
*Assistant Examiner*—Laura Freedman
(74) *Attorney, Agent, or Firm*—Gene Scott; Patent Law & Venture Group

(57) ABSTRACT

A three wheeled vehicle (1) has a front section (10) having a front frame (105), a directionally controllable front wheel (101) and a steering column (104) with a handlebar (1040). A rear section (11) has a rear frame (107) and two rear wheels (102,103). The front section (10) of the vehicle is pivotable about a pivot axis (111) located intermediate the two rear wheels (102,103). The pivot axis (111) includes a pivot bar (401) and a pivot bar housing (402) in communication with a transmission mechanism having a first and second gear pairs (2) (3). The transmission mechanism is releasably connected to the steering column (104) and is capable of pivoting the first section (10) about the pivot axis (111) towards the center-of-curvature of a turn in accordance with the angle of the front wheel (101), thus providing greater stability for the vehicle (1) during a turn.

12 Claims, 18 Drawing Sheets

U.S. PATENT DOCUMENTS 5,941,548 A * 8/1999 Owsen .................. 280/282
6,328,125 B1 * 12/2001 Van Den Brink et al. .... 180/211
6,352,274 B1 * 3/2002 Redman .................. 280/248
2003/0214113 A1 * 11/2003 Bank .................... 280/282

* cited by examiner

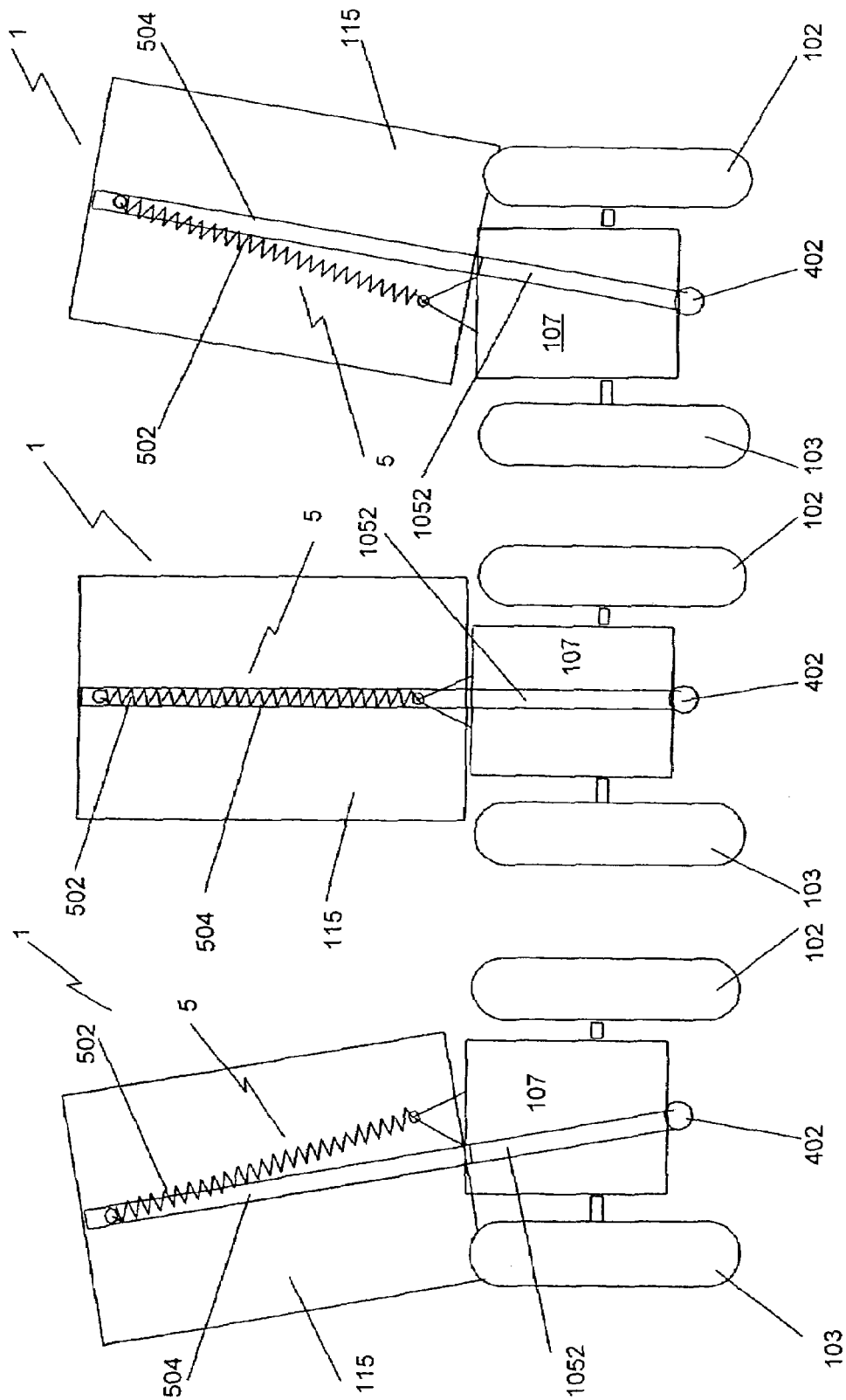

C - C

THREE WHEELED VEHICLE WITH TILTING MECHANISM

CROSS-REFERENCE TO RELATED APPLICATIONS

This application claims priority under the Patent Cooperation Treaty of serial number PCT/IE2004/000064 having an International filing date of Apr. 5, 2004 and an official priority date of 2 May 2003.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

REFERENCE TO A "MICROFICHE APPENDIX"

Not applicable.

BACKGROUND OF THE INVENTION

1. Field of the Present Disclosure

This disclosure relates generally to three-wheeled vehicles with one front wheel and two rear wheels and more particularly to a three-wheeled vehicle having a tilting mechanism, which allows the three-wheeled vehicle to have an improved driving stability and maneuverability.

2. Description of Related Art Including Information Disclosed under 37 CFR 1.97 and 1.98

Three-wheeled vehicles or tricycles are known to be safer to drive and easier to operate in comparison with two-wheeled vehicles. However, a three-wheeled vehicle has poor stability on bends. When making a turn, the three-wheeled vehicle is laterally inclined towards the outer side of the turn's curve by a centrifugal force. This is because the centre of gravity of the vehicle is concentrated in the upper part of the vehicle and centrally between both sides of the vehicle. Thus there is a danger of the three-wheeled vehicle turning over if the turn is attempted at a higher speed. Conversely, a two-wheeled vehicle has far greater stability on bends as the rider of the vehicle is able to incline himself towards the centre of curvature of the turn, thus moving the centre of gravity of the vehicle closer to the centre of curvature, thereby counterpoising the centrifugal force more effectively.

There have been a number of attempts to equip a three-wheeled vehicle with tilting means in order to improve its stability on bends especially at higher speeds. Typical prior art is shown in U.S. Pat. No. 4,572,535 (Stewart et al) where tilting motion of the vehicle is achieved through body control of the driver; and U.S. Pat. No. 5,927,424 (Van Der Brink et al) where a sensor and a complex tilting structure are provided for stabilizing a vehicle on bends. The prior art devices, however, have not been successful as they are either too costly to produce or uncomfortable and overly complicated for the rider when in use.

BRIEF SUMMARY OF THE INVENTION

This disclosure teaches certain benefits in construction and use which give rise to the objectives described below.

It is the object of the present invention to seek to alleviate the above mentioned disadvantages associated with the prior art.

Accordingly, the present invention provides a vehicle with three wheels, the vehicle comprising a front section and a rear section and the vehicle being suitable for travelling with the front section leading and the front section being suitable to accommodate at least one rider, and wherein the front section comprises a front frame, a directionally controllable front wheel and an operating means for controlling said wheel, and the rear section comprises a rear frame and two rear wheels, the wheels being spaced apart from each other, the front section of the vehicle being pivotable with respect to the second section about a pivot axis, the pivot axis being located intermediate the two rear wheels and the pivot axis extending from the rear section towards the front section at an acute angle to the ground, said pivot axis being provided by a pivot means arranged between the front section and the rear section, the pivot means being in communication with a transmission mechanism, the transmission mechanism being releasably connected to the operating means and the transmission mechanism being capable of pivoting the first section about the pivot axis towards the centre of the curvature of the turn in accordance with the angle of turn of the front wheel, thus providing greater stability for the vehicle during a turn while the second section remains in an unchanged position.

Ideally, the pivot means comprise a pivot bar rotatable within a housing wherein the pivot bar is fixedly coupled with the front frame and the housing is fixedly coupled with the rear frame. Preferably, the pivot means are located at an angle to the ground so that the pivot axis extends towards the front wheel and meets a point on the front wheel at which the front wheel touches the ground.

Ideally, the transmission mechanism comprises a connecting shaft extending between the operating means and the rear frame, a first gear pair, said first gear pair arranged between the operating means and the front end of the connecting shaft and a second gear pair, said second gear pair arranged between the rear end of connecting shaft and the rear frame.

Preferably, the operating means comprise a substantially vertical steering column, the steering column being turnable about its longitudinal axis by a handlebar and the steering column being connected to the front wheel so that turning of the steering column results in the front wheel turning in the same direction by a corresponding angle.

Preferably, the connecting shaft is mounted on the front frame by means of at least one support member in which support member the connecting shaft is rotatable about its longitudinal axis.

Ideally, the connecting shaft comprises a front portion and a rear portion.

Advantageously, the first gear pair comprises a front gear rigidly coupled with the steering column and a front pinion rigidly coupled with the front portion of the connecting shaft; and the second gear pair comprises a rear gear rigidly coupled with the rear frame and a rear pinion rigidly coupled with the rear portion of the connecting shaft.

Advantageously, the rear gear comprises an arcuate cogged surface, the arcuate cogged surface having a central axis, the central axis coinciding with the pivot axis of the vehicle.

Preferably, a release mechanism is provided in the transmission mechanism, the release mechanism being operable to disconnect the transmission mechanism from the operating means thereby preventing the first section from being pivoted about the pivot axis towards the centre of the curvature of the turn in accordance with the angle of turn of the front wheel, the release mechanism being further operable to re-establish the connection between the transmission means and the operating means. The release mechanism is further capable of locking the first section of the vehicle in an upright position. The release mechanism is further capable of providing an intermediate mode of operation for the vehicle in which the at least one rider can use his body weight for pivoting the first section about the pivot axis.

Conveniently, a biasing means is provided between the first section and the second section, the biasing means being operable to assist returning of the front section of the vehicle into an upright position. Preferably, the biasing means is a spring mechanism comprising at least one spring extending between the driver's seat and the rear frame.

Advantageously, the vehicle may be driven by an engine which operates and drives the rear wheels and the vehicle's braking system can be controllable by flexible control cables or flexible pneumatic cables.

The invention will now be described more particularly with reference to the accompanying drawings, which show, by way of example only, two embodiments of a three-wheeled tilting vehicle according to the invention having an engine which operates and drives the rear wheels, although not limited to the use of such type of engine in the present invention.

BRIEF DESCRIPTION OF THE SEVERAL VIEWS OF THE DRAWING(S)

Illustrated in the accompanying drawing(s) is at least one of the best mode embodiments of the present invention In such drawing(s):

FIG. 12 is a schematic rear view of the first embodiment of the vehicle showing the spring mechanism when the vehicle is turning left;

FIG. 13 is a schematic rear view of the vehicle of FIG. 12 showing the spring mechanism in an upright position;

FIG. 14 is a schematic rear view of the vehicle of FIG. 12 showing the spring mechanism when the vehicle is turning right;

DETAILED DESCRIPTION OF THE INVENTION

Figure 1:
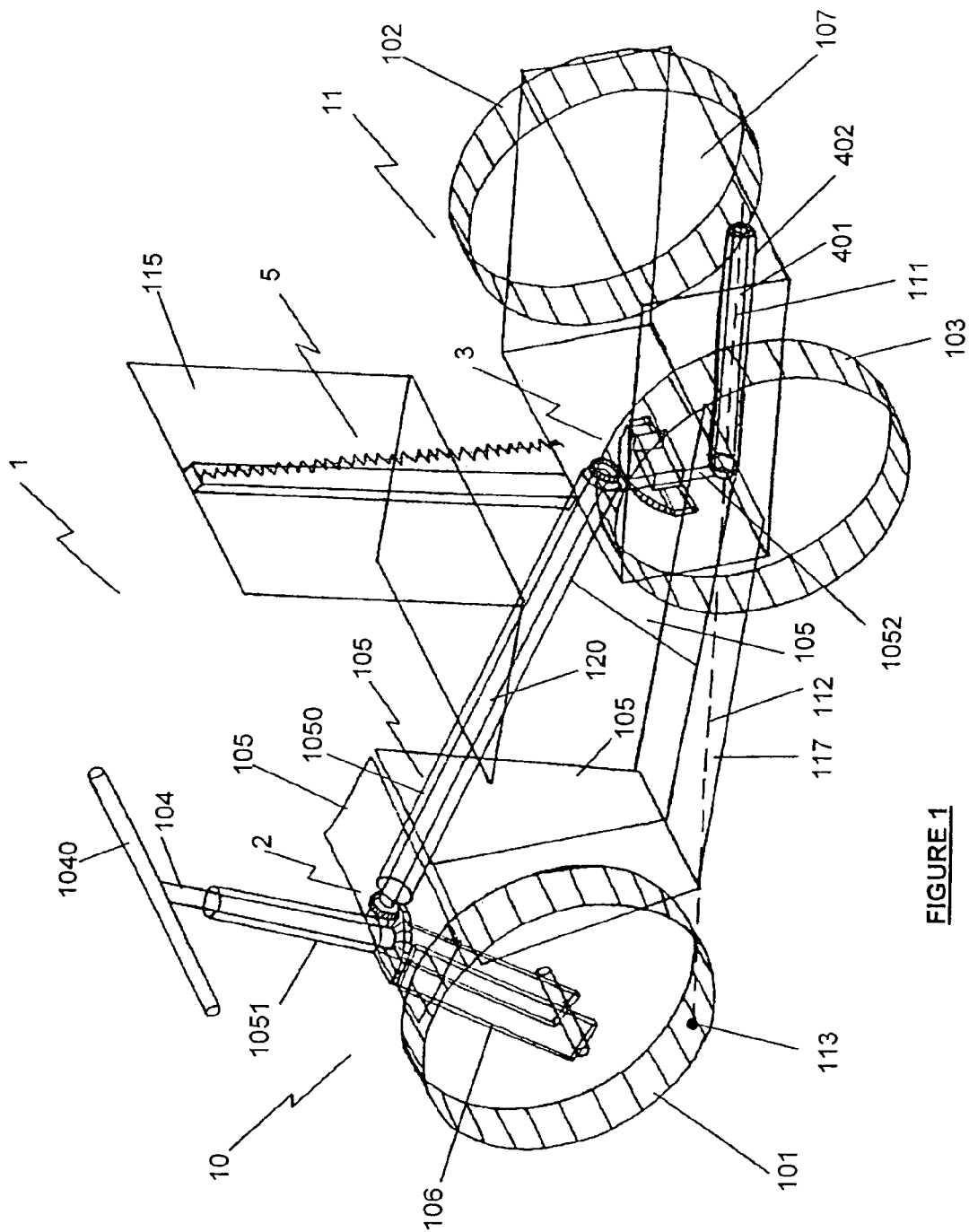
FIG. 1 is a schematic perspective view of a first embodiment of a three-wheeled vehicle in accordance with the invention.
Figure 2:
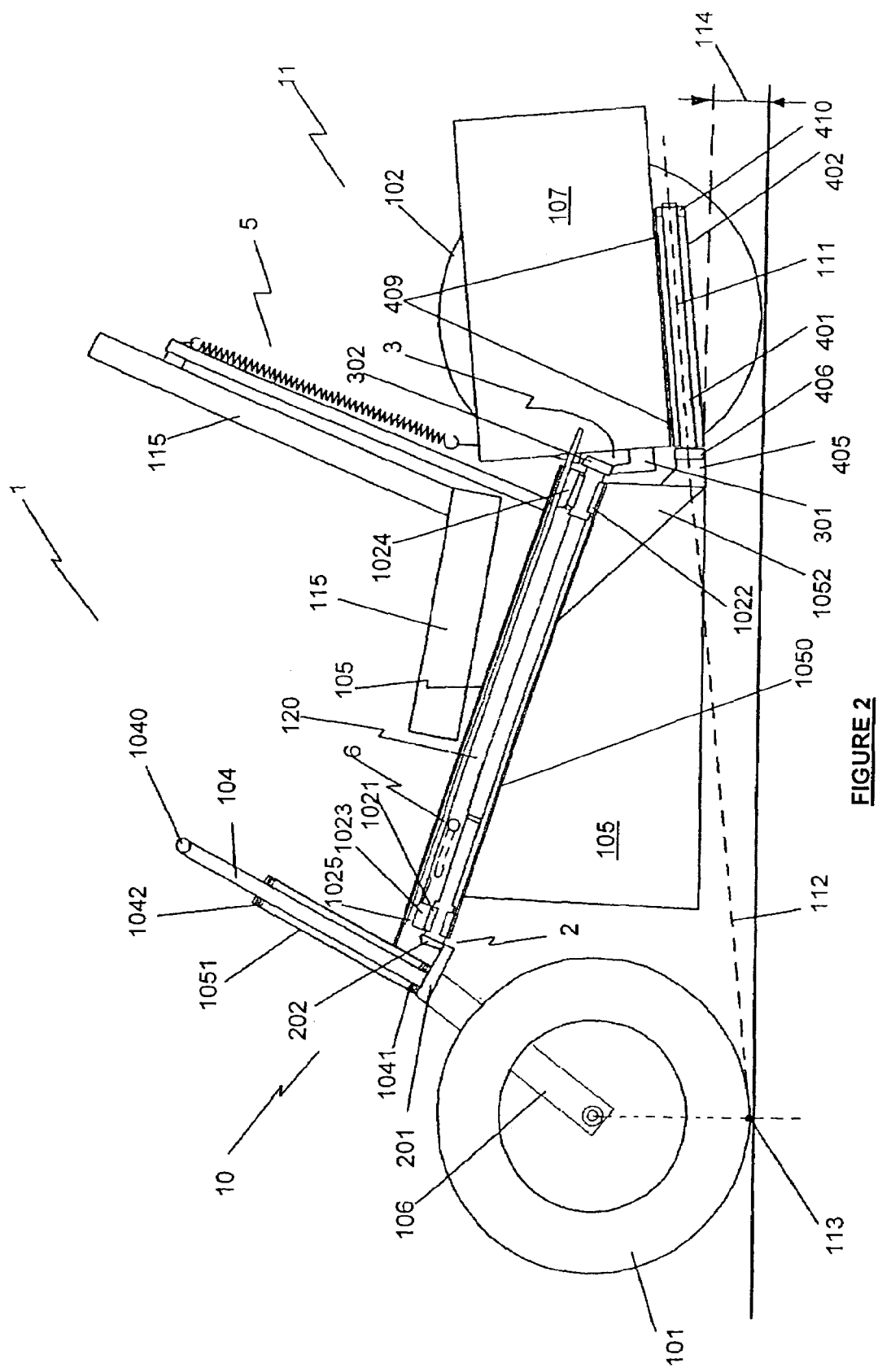
FIG. 2 is a schematic side cross sectional elevation thereof.
Figure 3:
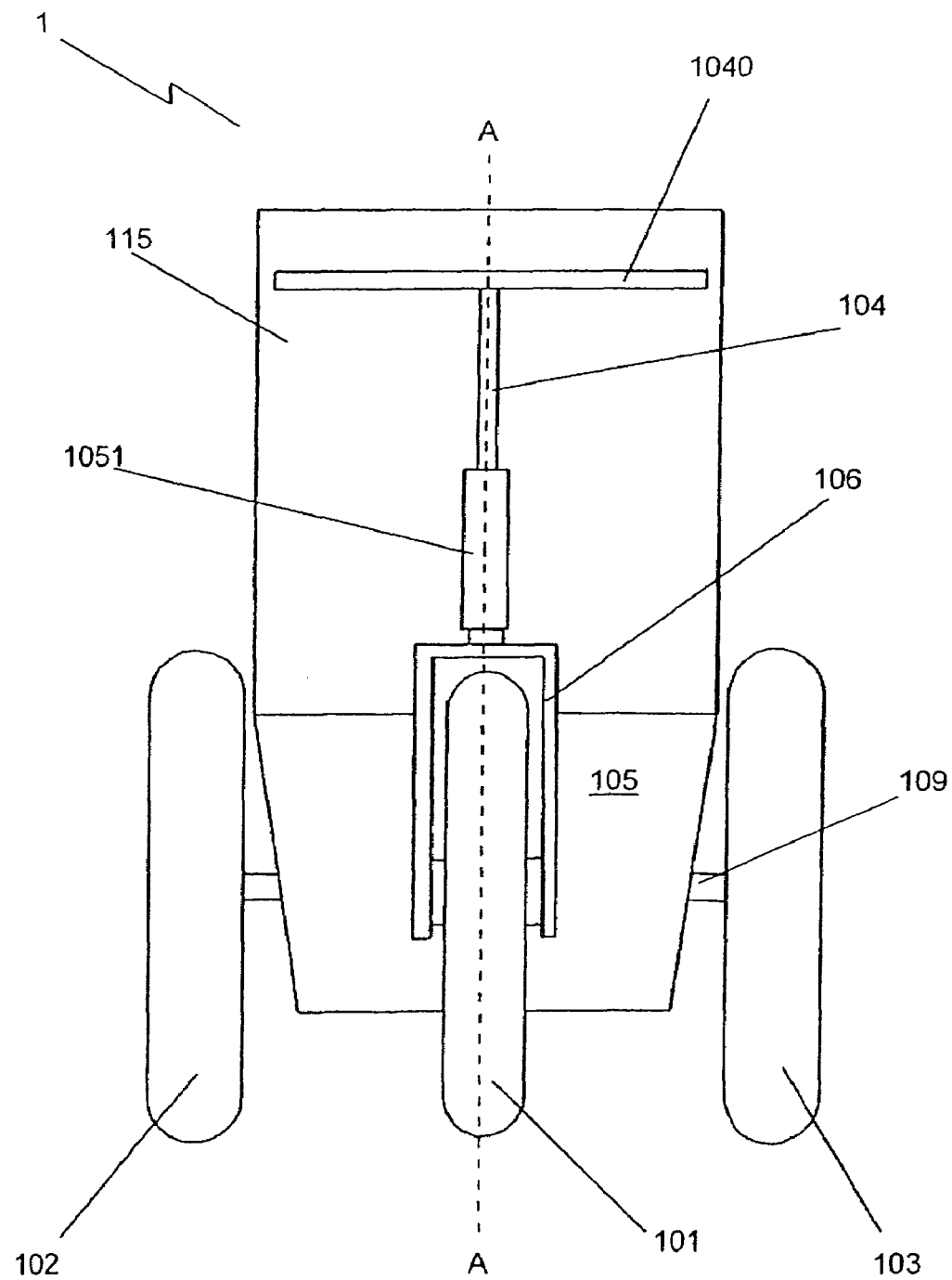
FIG. 3 is a schematic front elevation thereof.
Figure 4:
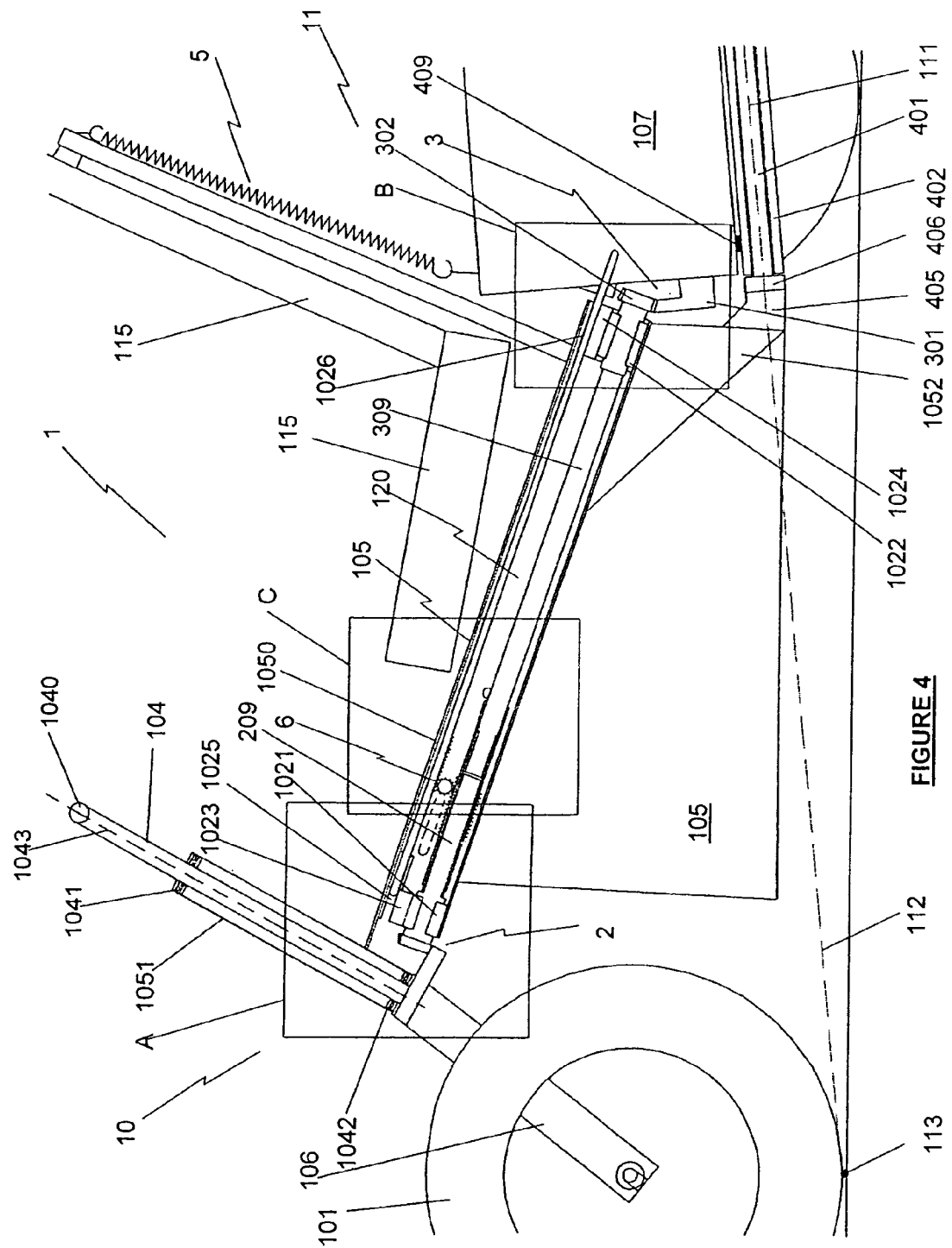
FIG. 4 is an enlarged view FIG. 2.

The above described drawing figures illustrate the described apparatus and its method of use in at least one of its preferred, best mode embodiment, which is further defined in detail in the following description. Those having ordinary skill in the art may be able to make alterations and modifications what is described herein without departing from its spirit and scope. Therefore, it must be understood that what is illustrated is set forth only for the purposes of example and that it should not be taken as a limitation in the scope of the present apparatus and method of use.

Referring initially to FIGS. 1 to 4 of the drawings, a first embodiment of the three-wheeled tilting vehicle of the invention is indicated generally by reference numeral 1. The three wheeled tilting vehicle 1 comprises two main sections, a front section 10 and a rear section 11. The front section 10 is tiltable towards the centre of curvature of a turn or bend in the road or surface on which the vehicle is being driven and the rear section 11, which is not tiltable and which remains in an upright position whether the vehicle is performing a turn or moving in a straight direction.

The front section 10 comprises a front frame, generally indicated by reference numeral 105 and a front wheel 101, connected to each other by connection means 106. In this preferred embodiment the connection means 106 is in the form of a connecting fork. The fork 106 has a rigid connection to a steering column 104. The steering column has a handlebar 1040 and is in communication with a front gear arrangement 2. A connecting shaft, generally indicated by reference numeral 120, extends between the steering column 104 and the rear section 11. The connecting shaft 120 comprises a front portion 209 and a rear portion 309. The vehicle 1 also includes a driver's seat 115, a footrest 117 and a spring mechanism, generally indicated by reference numeral 5.

The front frame 105 includes a generally vertical tubular portion 1051 within which the steering column 104 is rotatably mounted and a generally horizontal tubular portion 1050 within which the connecting shaft 120 is rotatably mounted. The steering column 104 is rotatable about its longitudinal axis 1043 and is supported in the vertical portion 1051 by a lower bearing 1042 and an upper bearing 1041. The connecting shaft 120 is supported in the horizontal part 1050 by a bearing 1021 at its front portion 209 and by a bearing 1022 at its rear portion 309 (shown in FIG. 7). The bearing 1021 is retained in position by a bearing holder 1023 and the bearing 1022 is retained in position by a bearing holder 1024.

The rear section 11 comprises a rear frame 107, two rear wheels 102 and 103 set apart from each other and connected by a shaft 109 which is perpendicular to the median plane A-A of the vehicle 1 (shown in FIG. 3), an engine (not shown in the drawings), a rear gear arrangement, indicated generally by reference numeral 3, a pivot bar 401 attached rigidly to a rear vertical portion 1052 of the front frame 105 by means of an extension 405 and a collar 406; and a pivot bar housing 402 rigidly attached to the rear frame 107 by means of fixing members 409.

The longitudinal axis 111 of the pivot bar 401 is located within the median plane A-A of the vehicle 1 at an angle to the ground so that an imaginary extension 112 of the longitudinal axis 111 meets the point 113 where the front wheel 101 touches the ground. The pivot bar 401 and the pivot bar housing 402 have to be strong enough to avoid flexing in any direction, as they bear most of the weight of the front section 10 of the vehicle 1. Also, the pivot bar 401 and the pivot bar housing 402 have to have a sufficient ground clearance 114, which may vary for light weight vehicles and heavy weight vehicles. The pivot bar 401 is rotatable within the pivot bar housing 402. Since the front frame 105 and the pivot bar 401 are connected rigidly to each other, the front frame 105 rotates together with the pivot bar 401. The pivot bar 401 is prevented from axial movement within the pivot bar housing 402 by means of a retaining nut 410.

The rear section 11 of the vehicle 1 remains in an upright position regardless of whether the vehicle 1 is moving in a straight ahead, linear direction or turning, whereas the front section 10 together with the driver is tiltable laterally about the longitudinal axis 111 of the pivot bar 401 when the vehicle 1 is performing a turn.

Tilting of the front section 10 is achieved by transferring rotary motion of the steering column 104 through the front gear arrangement 2 and through the connecting shaft 120 to the rear gear arrangement 3 and to the pivot bar 401. The handlebar 1040 of the steering column 104 enables the driver to control the steering column 104. When the steering column 104 is rotated, the fork 106 rotates together with the steering column 104, thereby turning the front wheel 101 coupled with the fork 106.

Figure 5:
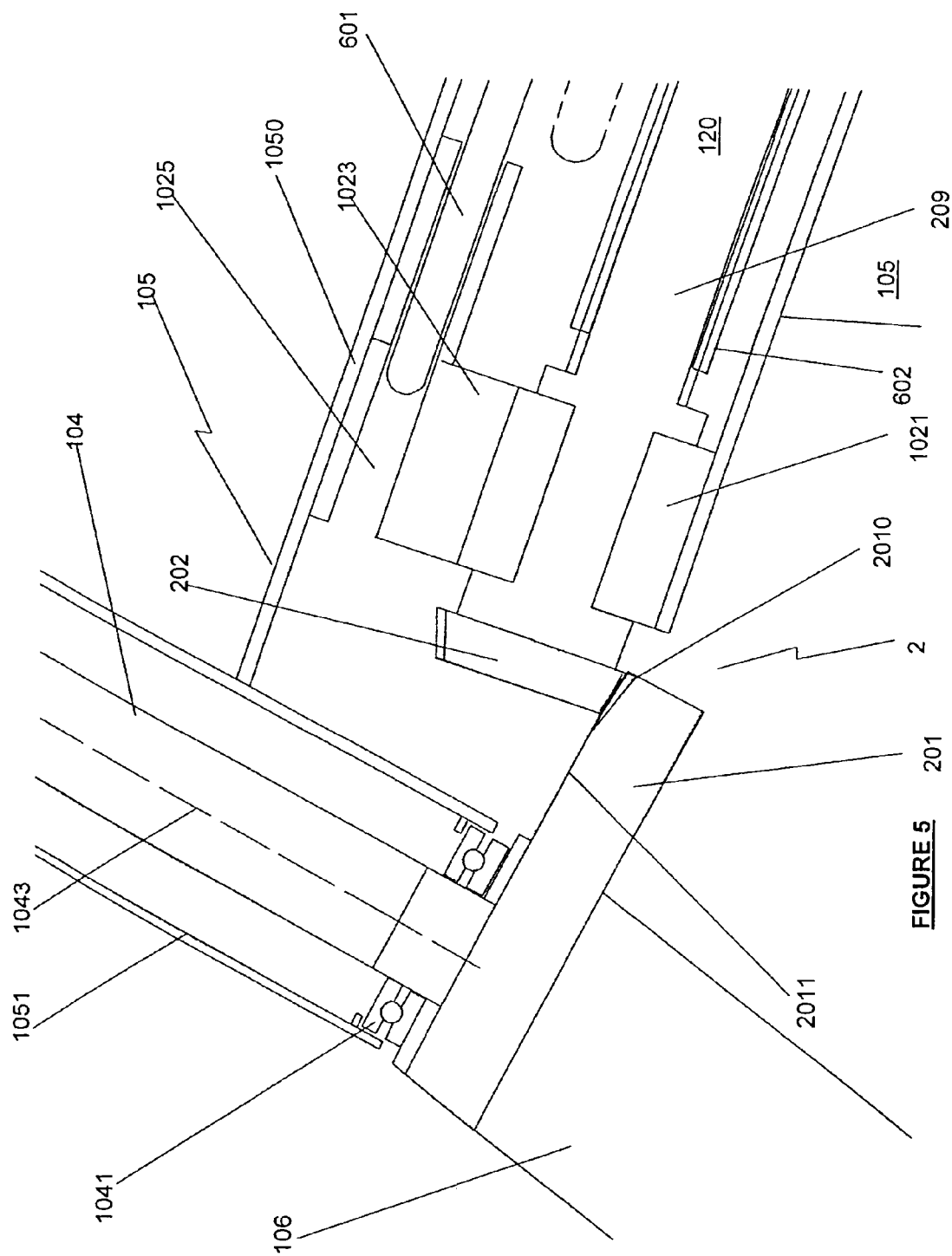
FIG. 5 is an enlarged view of area A of FIG. 4 showing the front gear arrangement of the vehicle.
Figure 6:
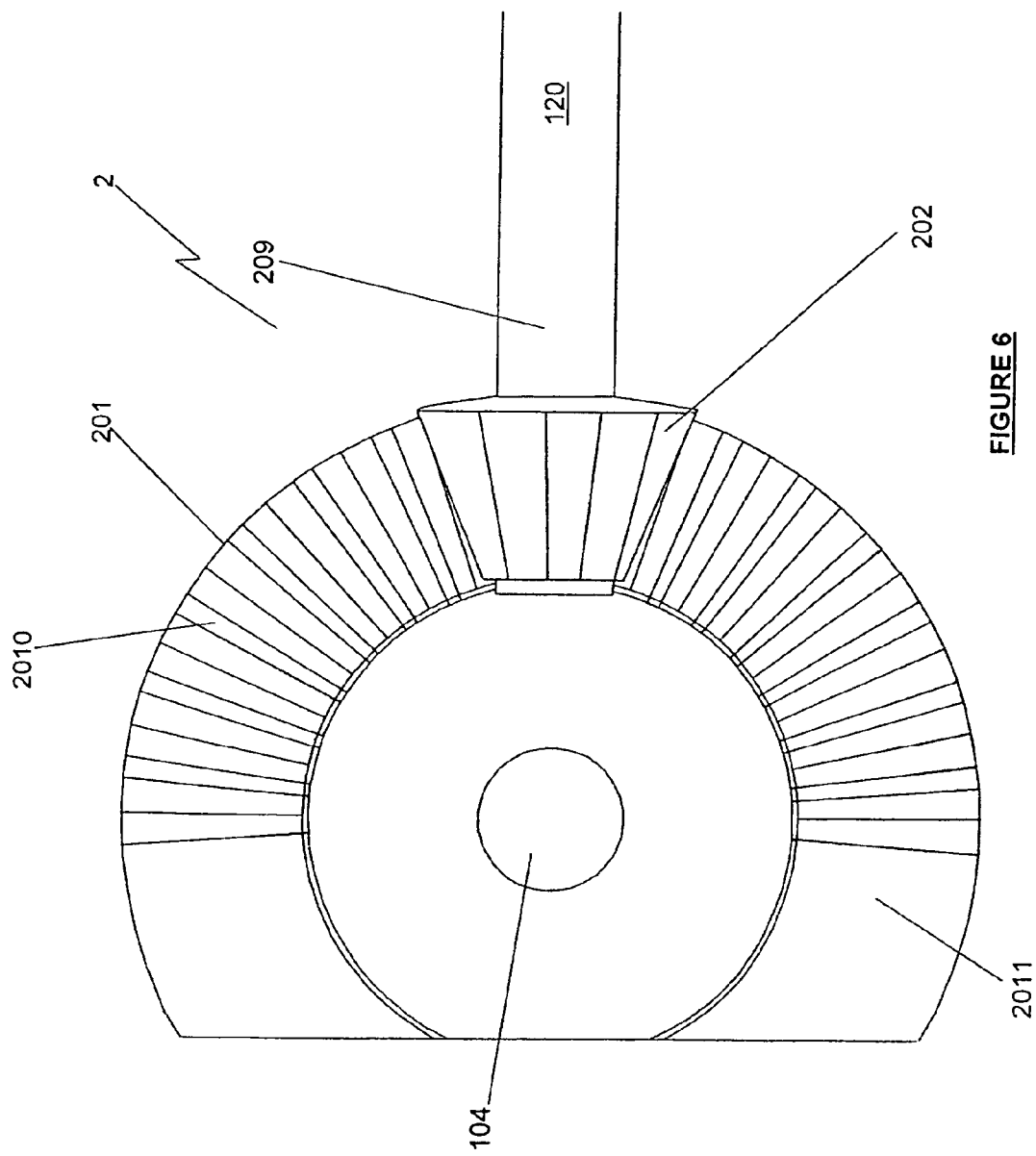
FIG. 6 is a schematic plan view of the front gear arrangement in accordance with FIG. 2.

Referring now to FIG. 5 and FIG. 6 of the drawings, the front gear arrangement 2 comprises a gear 201 rigidly attached to the steering column 104. The gear 201 has a shape of a disk or a part of a disc with cogs 2010 on a part of a circumference of one of its faces 2011. Preferably, the gear 201 is located between the steering column 104 and the fork 106. The gear 201 is engaged with a front pinion 202, preferably of a conical shape, attached to the front portion 209 of the connecting shaft 120.

Figure 7:
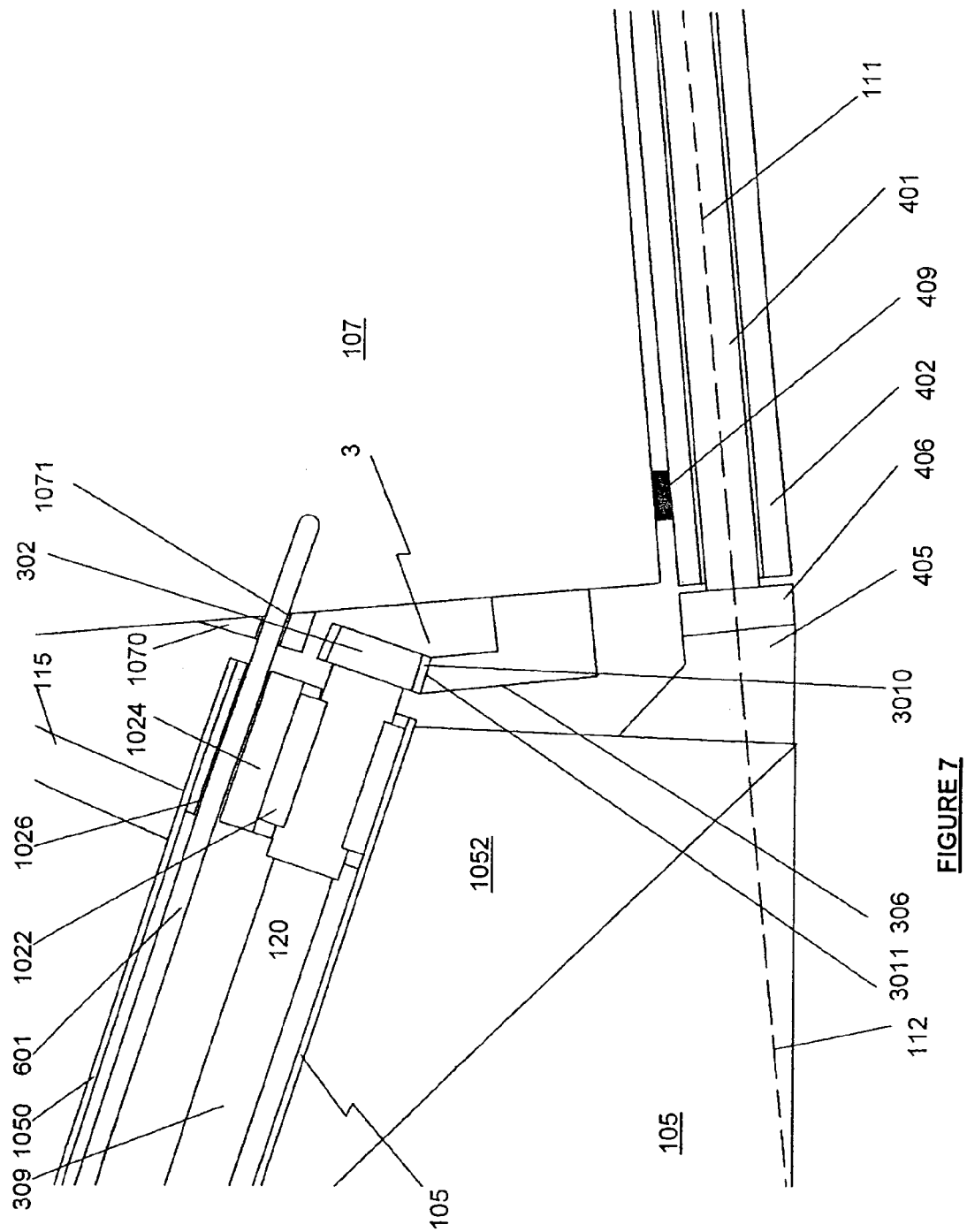
FIG. 7 is an enlarged view of area B of FIG. 4 showing the rear gear arrangement according to FIG. 2.
Figure 8:
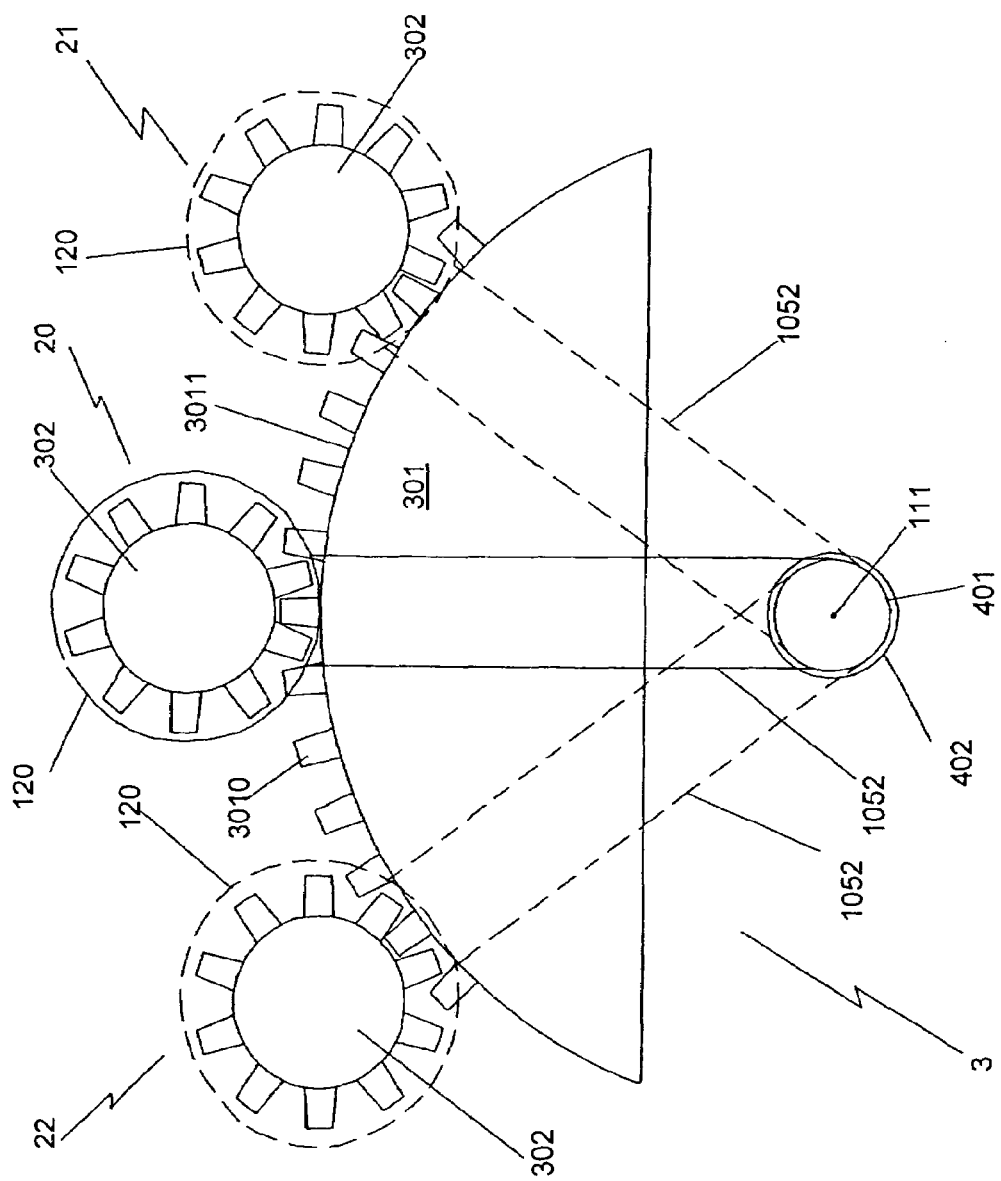
FIG. 8 is a schematic rear view of the rear gear arrangement of the first embodiment of the vehicle of the invention showing three positions of a rear pinion and of a front frame.

The functioning of the vehicle in use for performing a turn will now be described. When the vehicle 1 is performing a turn, the gear 201 rotates together with the steering column 104. Since the gear 201 is engaged with the front pinion 202, the gear 201 transfers the rotary motion of the steering column 104 to the front pinion 202. The front pinion 202 rotates the connecting shaft 120 thereby transferring the rotary motion to the rear gear arrangement 3. Referring now to FIG. 7 and FIG. 8 of the drawings, the rear gear arrangement 3 comprises a rear pinion 302, preferably of a conical shape, attached to the rear portion 309 of the connecting shaft 120 and engaged with a gear 301, attached rigidly to the rear frame 107 of the vehicle and having a shape of a part of a disc, preferably a segment of a disc, the longitudinal axis (not shown) of which coincides with the longitudinal axis 111 of the pivot bar 401. The gear 301 has cogs 3010 on its circular surface 3011. The amount of cogs for different types of vehicles may vary and depends on the degree of tilt required in accordance with the weight of the vehicle. Smaller tilting angle is required for heavy weight vehicles. The rear pinion 302 rotates together with the connecting shaft 120 and, being engaged with the gear 301 travels around the circular surface 3011 of the rear gear 301 in one direction or in the opposite direction, in accordance with the direction of rotation of the steering column 104, thereby enabling the front section 10 to tilt around the longitudinal axis 111 of the pivot bar 401, while the rear section 11 of the vehicle 1 remains in an upright position.

In FIG. 8 of the drawings, a schematic rear elevation view of the rear gear arrangement 3 illustrates three positions of the rear pinion 302 together with the rear vertical portion 1053 of the frame 105. Position 20 is the middle position of the second rear pinion 302 on the rear gear 301 when the front section 10 vehicle is in an upright position. Position 21 is the end position of the rear pinion 302 on the gear 301 when the vehicle is turning right. Position 22 is the end position of the rear pinion 302 on the gear 301 when the vehicle is turning left.

Figure 9:
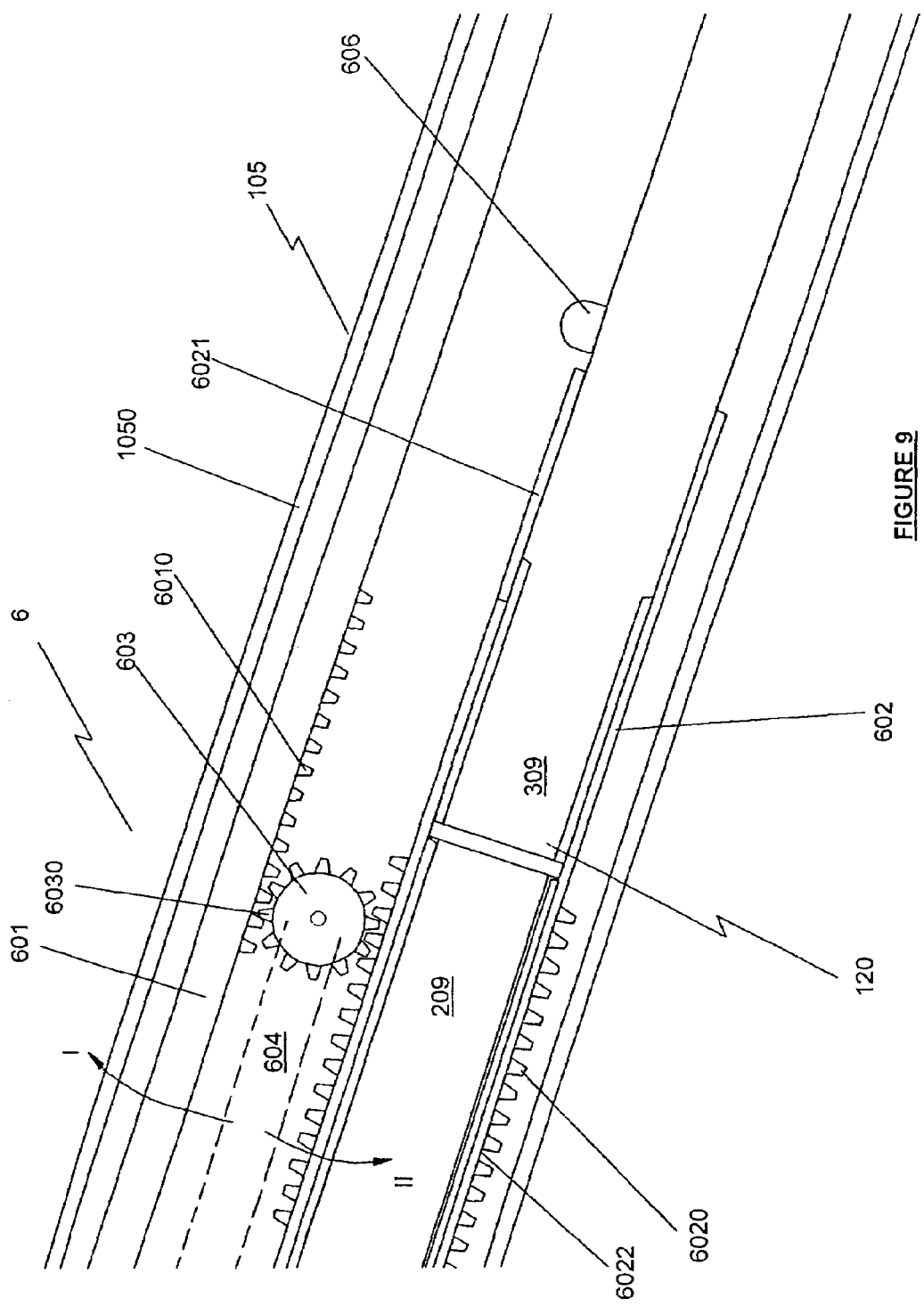
FIG. 9 is an enlarged view of area C of FIG. 4 showing a locking/unlocking mechanism of the vehicle.
Figure 10:
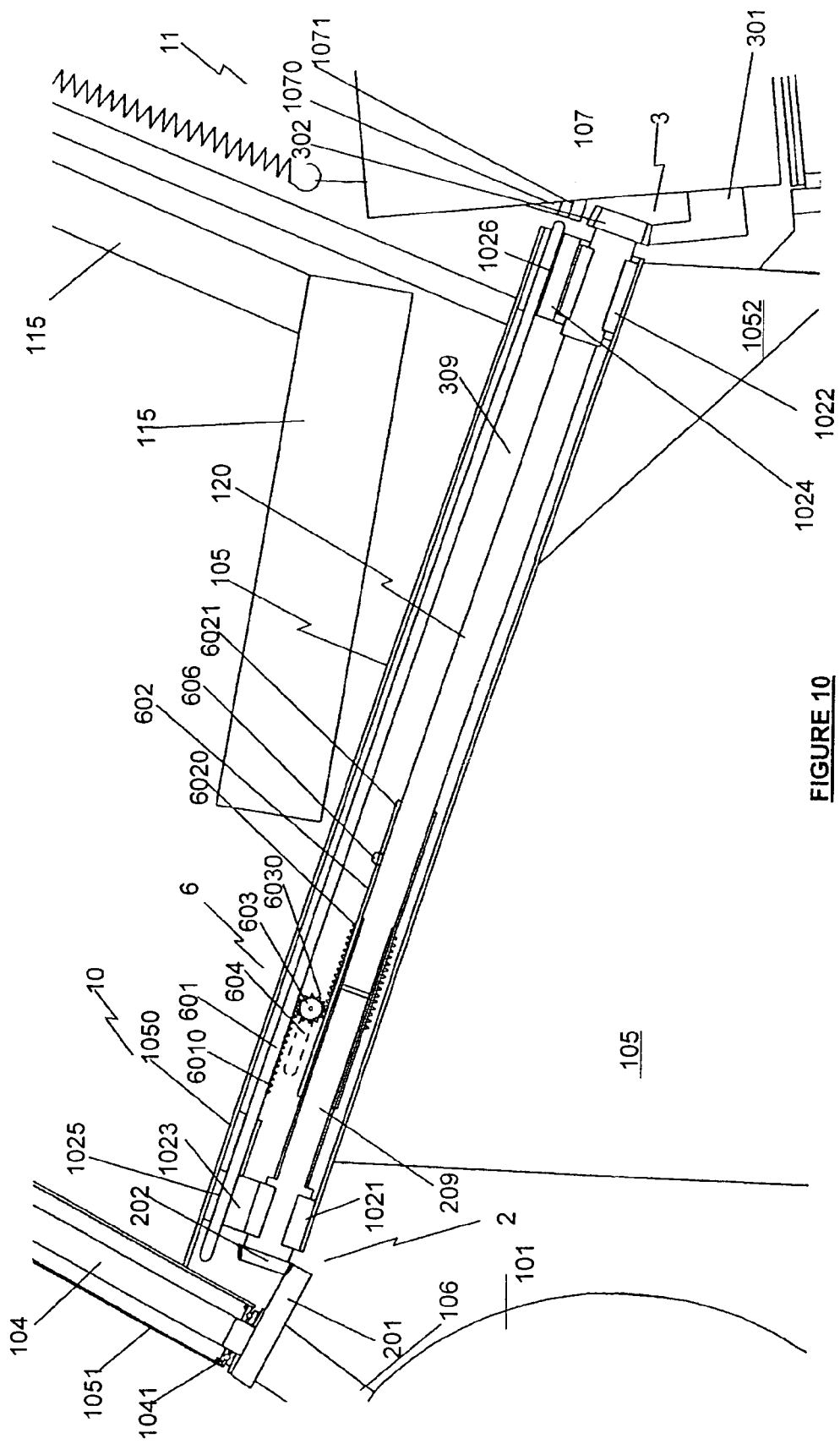
FIG. 10 is an exploded view of a part of FIG. 2 showing a horizontal part of the frame of the vehicle, the front and rear gear arrangements and the locking/unlocking mechanism in an unlocked mode.

The vehicle of the invention can also be provided with a locking/unlocking mechanism 6, one embodiment of which is illustrated in FIG. 9 and FIG. 10 of the drawings. The locking/unlocking mechanism 6 allows the front section 10 to be locked in an upright position by disengaging the front portion 209 of the connecting shaft 120 from the rear portion 309 of the connecting shaft 120 and by securing the front section 10 to the rear section 11 and thereby preventing the rear pinion 302 from moving around the gear 301. This mode of operation of the vehicle is a "locked" mode. The locking/unlocking mechanism 6 is also operable so that it can be released to permit the rear pinion 302 to move around the gear 301, thereby permitting tilting of the front section 10, in accordance with user's requirements. This mode of operation of the vehicle is a "controllably tilting" ("unlocked") mode.

A way of transition between the "controllably tilting" and "locked" modes of operation of the vehicle will now be described below.

A locking bar 601 is located within the horizontal part 1050 of the front frame 105 and is slideable inside an aperture 1025 of the bearing holder 1023 and inside an aperture 1026 of the bearing holder 1024. The locking bar 601 has a number of cogs 6010. A sliding tube 602 is mounted on the outer surface of the connecting shaft 120 so that a part of the front portion 209 and a part of the rear portion 309 of the connecting shaft are surrounded by the tube 602. The sliding tube 602 has a number of cogs 6020 on its outer surface, each cog 6020 being in the form of a circular ledge on the circular surface 6022 of the sliding tube 602. A slot 6021 in the wall of the sliding tube 602 is engagable with a centring pin 606 of the rear portion 309 of the connecting shaft 120. The slot 6021 is engaged with the centring pin 606 when the tilting mechanism is unlocked and rigidly links the front portion 209 and the rear portion 309 of the connecting shaft 120. A cog wheel 603 is located within the horizontal part 1051 of the front frame 105 between the locking bar 601 and the sliding tube 602. The cog wheel 603 has cogs 6030 engaged with the cogs 6010 of the locking bar 601 and with the cogs 6020 of the sliding tube 602. The cogwheel 603 has a lever 604 located outside the front frame 105. When the cog wheel 603 is rotated by rotating the lever 604 in direction I (FIG. 9) the cog wheel 603 pushes the sliding tube 602 forward, away from the rear portion 309 of the connecting shaft 120 disengaging the slot 6021 from the centring pin 606, thereby disconnecting the front portion 209 from the rear portion 309 of the connecting shaft 120, leaving the front portion 209 rotatable by the front pinion 202; and at same time the cog wheel 603 pushes the locking bar 601 towards the rear frame 107 until the locking bar 601 enters a locking aperture 1071 in a protruding part 1070 of the rear frame 107, thereby preventing the rear pinion 302 from moving around the gear 301.

When the cog wheel 603 is rotated by rotating the lever 604 in direction II (FIG. 10) the cog wheel 603 pushes the sliding tube 602 back towards the rear portion 309 of the connecting shaft 120 so that the slot 6021 engages the centring pin 606, thereby connecting the front portion 209 with the rear portion 309 of the connecting shaft 120. The front wheel 101 has to be oriented straight forward to ensure that the slot 6021 engages the centring pin 606; and at same time the cog wheel 603 pushes the locking bar 601 away from the rear frame 107 until locking bar 601 comes out from the locking aperture 1071, thereby permitting the rear pinion 302 to travel around the rear gear 301.

Figure 11:
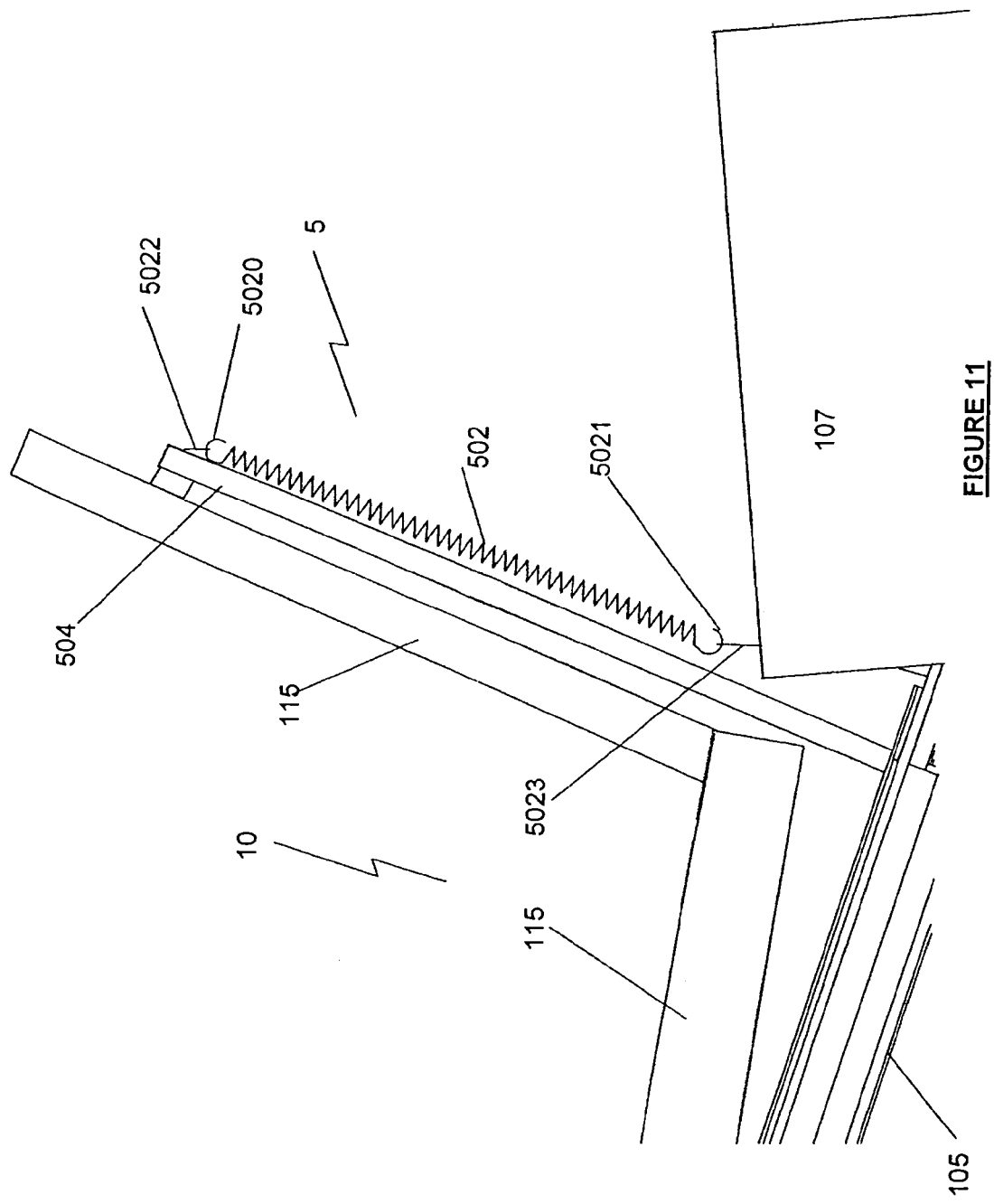
FIG. 11 is an enlarged view of part of FIG. 2 showing a spring mechanism of the vehicle.
Figure 15:
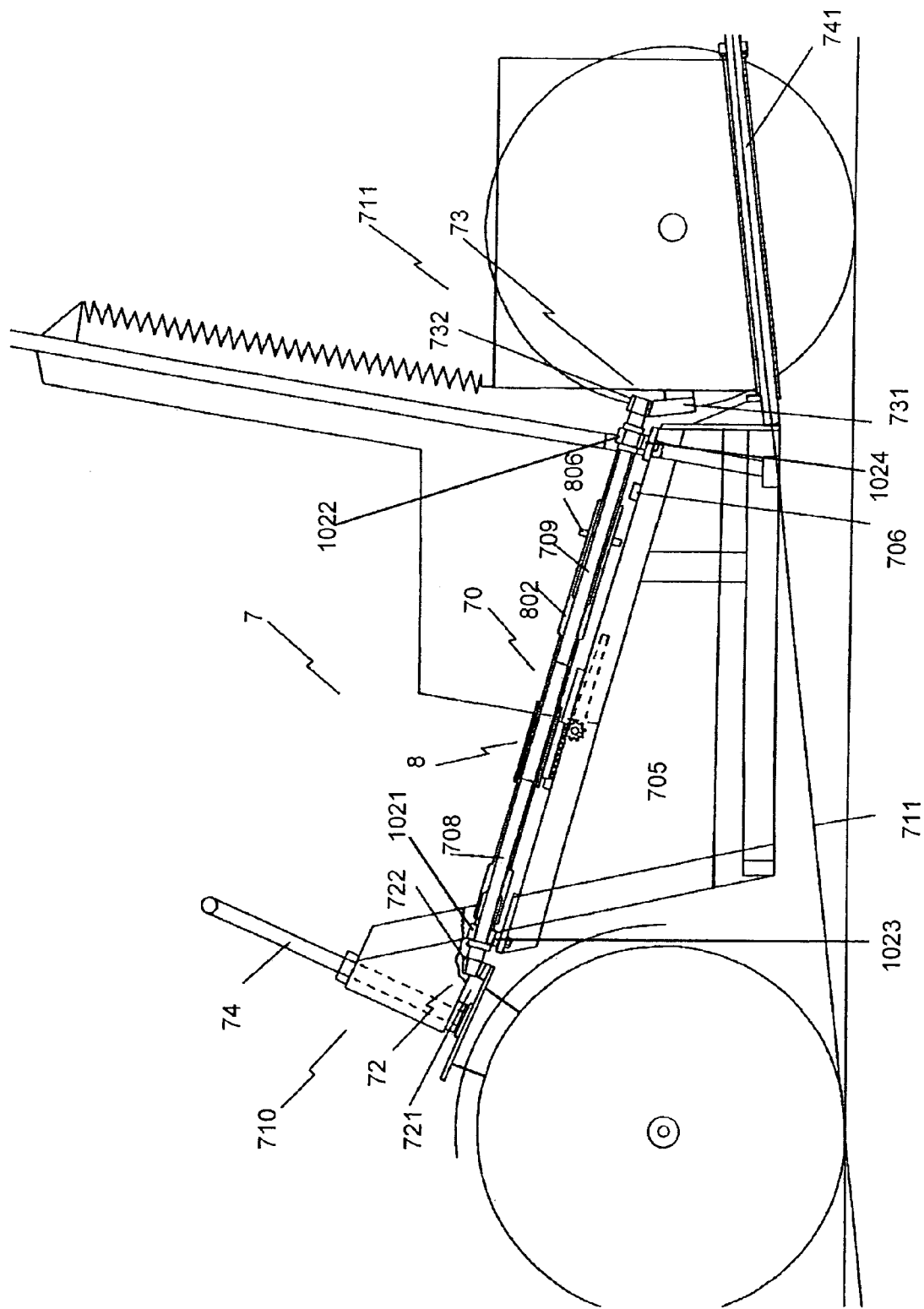
FIG. 15 is a schematic side cross sectional elevation of a second embodiment of the vehicle in accordance with the invention.

For additional driving safety and comfort, a spring mechanism 5, illustrated in FIG. 11 of the drawings, is provided in the vehicle of the invention. The spring 502 provides a quicker return of the front section 10 of the vehicle 1 together with driver into upright position on completion of a turn. The spring 502 also keeps the front section 10 in the upright position when the vehicle 1 is not occupied and resists tilting caused by vibrations.

Preferably, one end 5020 of the spring 502 is fixed by means of a connecting member 5022 to a seat support bar 504 and another end 5021 of the spring 502 is fixed by means of a connecting member 5023 the rear frame 107 of the vehicle. The seat support bar 504 is attached to the front frame 105 at its one end and to the driver seat 115 at its other end and has to be strong enough and rigid to avoid flexing in any direction.

When the front section 10 of the vehicle together with the driver is tilted by the tilting mechanism during a turn in a manner described above, the spring 502 stretches accordingly between the connecting members 5022 and 5023 towards the side of the tilt as illustrated on FIG. 12 to FIG. 14. Thus, the spring 502 does not allow the front section 10 of the vehicle 1 together with the driver tilt too low. On completion of the turn, the driver turns the steering column 104 by turning the steering handle 1040 back into its initial position as before the turn, thereby bringing the front wheel 101 in line with the road. At the same time, the centrifugal influence on the vehicle terminates and the front section 10 together with the driver is brought back into upright position as the tilting mechanism works astern. The spring 502 then compresses, thereby helping the front section 10 together with the driver overcome the gravity and facilitating the return of the front section 10 together with the driver into upright position on completion of the turn. Several parallel springs can be employed in the mechanism.

The ratio between the front gear arrangement 2 and the rear gear arrangement 3 determines the angle of tilt in relation to the angle of turn of the front wheel 101. For a lightweight vehicle the preferred ratio between the front gear arrangement 2 and the rear gear arrangement 3 is such that two degrees of turn of the front wheel 101 provide one degree of tilt. A heavy weight vehicle can have a smaller tilting angle than that of a lightweight vehicle at the same speed and at the same angle of turn of the front wheel.

The vehicle's braking system is controllable by flexible control cables. Flexible pneumatic cables may also be used to control the vehicle's braking system.

The vehicle can be driven by various types of engines, e.g. a battery engine or a petrol engine, or by foot pedals.

Shown in FIGS. 15 to 20, is a second embodiment of the tilting vehicle of the invention which is indicated generally by reference numeral 7. The vehicle 7 differs from the vehicle 1 in that a locking/unlocking mechanism 8 is provided instead of the locking mechanism 6. Functions of the locking/unlocking mechanism 8 are generally similar to the functions of the locking mechanism 6 of the vehicle 1, except that the locking/unlocking mechanism 8 is further operable to provide an intermediate free tilting ("bicycle") mode of operation for the vehicle 7.

In the intermediate mode of operation, the front portion 708 of the connecting shaft 70 is disengaged from the rear portion 709 of the connecting shaft 70, whereas the rear pinion 732 is movable about the rear gear 731. This mode of operation of the vehicle 7 enables the rider to tilt the front section 710 of the vehicle 7 using his body weight. This means that in this mode the driver can incline his body, and, accordingly, the front section 710 of the vehicle 7, during a turn towards the centre of the turn curve in a manner similar to that of a driver of a bicycle. This mode of operation can be useful for travelling at low speeds, when it is not necessary for the front section 710 of the vehicle 7 to use the maximum possible tilting angle during a turn, as it would be the case for travelling at higher speeds.

The locking/unlocking mechanism 8 comprises a sliding tube 802 which encompasses the front portion 708 of the connecting shaft 70 with its front end 802a, and the rear portion 709 of the connecting shaft 70 with its rear end 802b. The sliding tube 802 is slidably movable along the exterior surfaces of the front portion 708 and the rear portion 709 of the connecting shaft 70.

The sliding tube 802 is engageable with the front portion 708 by means of a first spline joint, which comprises grooves 812 in the interior surface of the sliding tube 802 and corresponding keys 712 on the exterior surface of the front portion 708 of the connecting shaft 70. The sliding tube 802 is engageable with the rear portion 709 by means of a second spline joint, which comprises grooves 813 in the interior surface of the sliding tube 802 and corresponding keys 713 on the exterior surface of the rear portion 709 of the connecting shaft 70.

The locking/unlocking mechanism 8 further comprises a rack tube 803 having a rack 807 projecting radially along the outer surface of the rack tube. The rack tube 803 is mounted intermediate the first spline joint and the second spline joint on the outer surface of the sliding tube 802. Axial movement of the rack tube 803 on the sliding tube 802 is prevented by stop rings 805. A rack guide 809 (best shown in FIG. 17) projects from an upper face 705a of the front frame 705. The rack guide 809 is provided for the rack 807 to prevent rotation of the rack tube 803 on the sliding tube 802 and to maintain correct orientation of the rack on the sliding tube 802.

The rack 807 is meshable with a cog wheel 830. The cog wheel 830 is rotatably mounted on the frame 705 and is located beneath the rack 807. The cog wheel 830 is provided with lever 840.

The locking/unlocking mechanism 8 further comprises a disk 806 fixed on the outer surface of the sliding tube 802 at the rear end 802b of the sliding tube 802. The disk 806 is provided with a radial slot 806a (best shown in FIG. 20) formed transversely through the body of the disk. The slot 806a is engageable with a stop 706, which projects upwardly from the upper face 705a of the front frame 705. The disk 806 is fixed on the sliding tube 802 so that the slot 806a and the stop 706 are in register when the front frame 705 is in an upright position.

In the "controllably tiltable" mode of operation (see FIG. 16), the grooves 812 and keys 712 are engaged in the first spline joint. The grooves 813 and the keys 813 are partially engaged in the second spline joint, so that a sufficient part of the length of each groove 813 remains unoccupied. The slot 806a and the stop 706 are disengaged. In this mode, the front section 710 is controllably tiltable around the longitudinal axis 711 of the pivot bar 741 by means of transition of a rotary motion from a steering column 74 through a front gear arrangement 72 to a rear gear arrangement 73 as described in detail with reference to the first embodiment of the vehicle.

Figure 16:
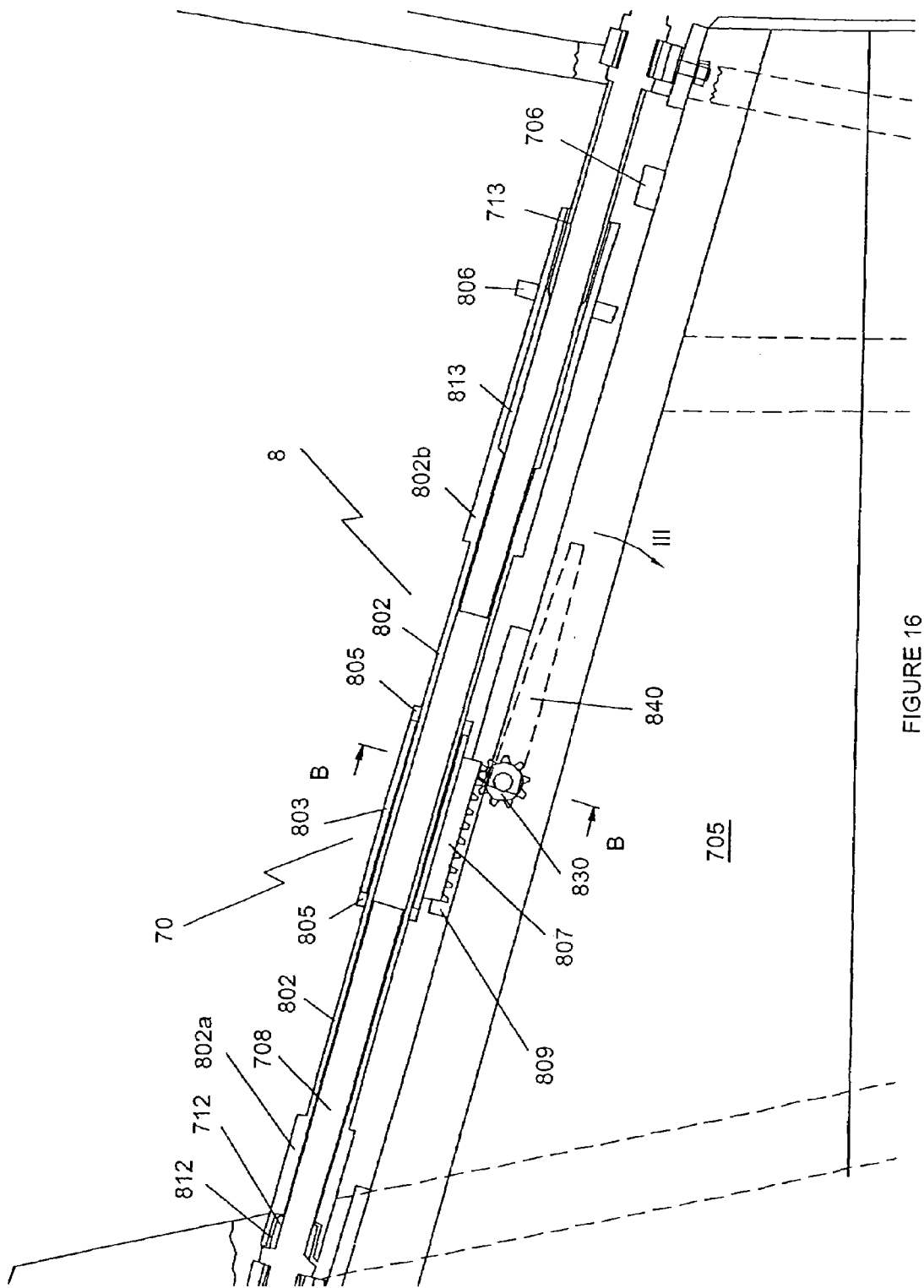
FIG. 16 is an enlarged portion of FIG. 15 showing the locking/unlocking mechanism in an unlocked mode.
Figure 17:
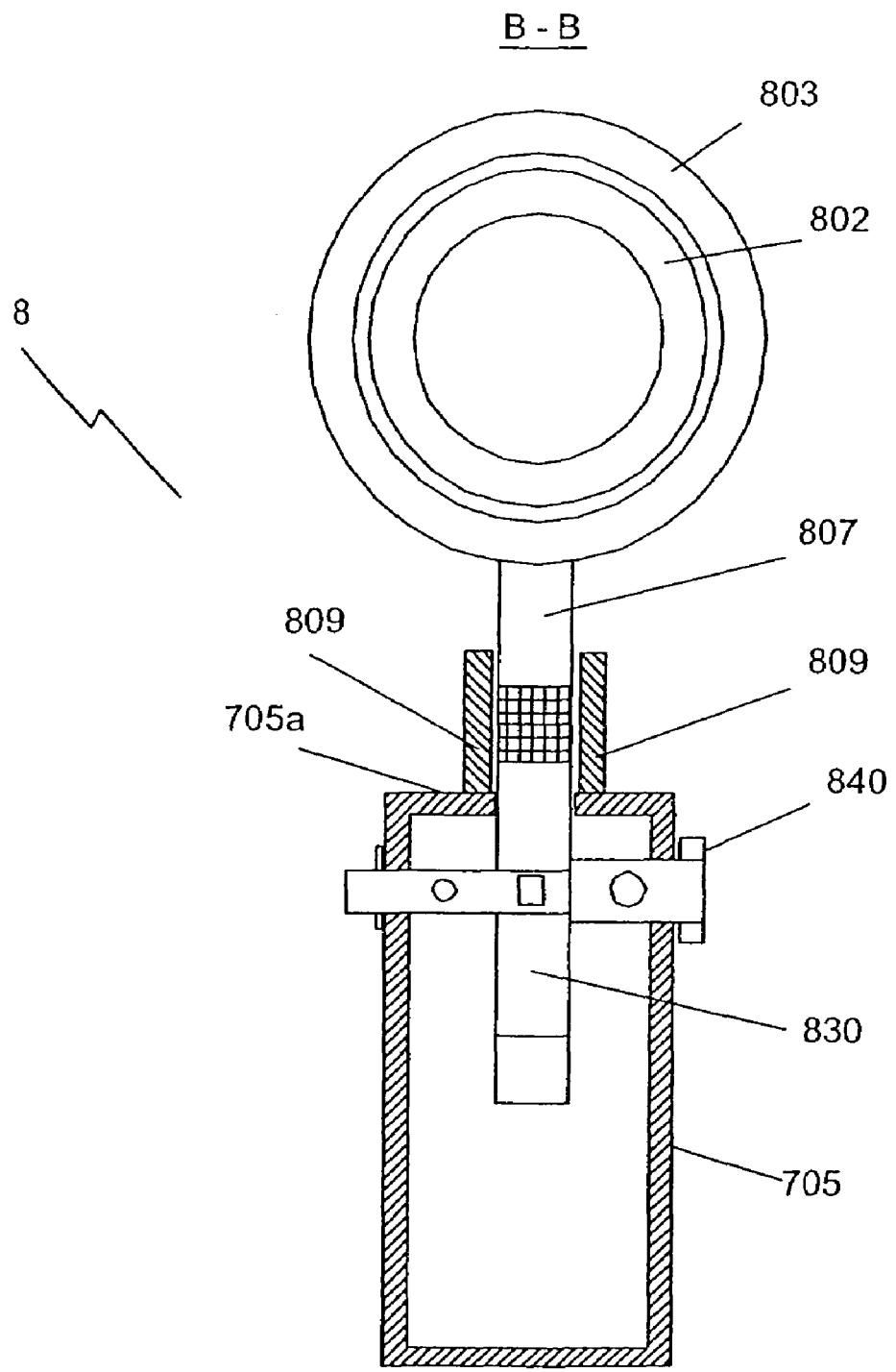
FIG. 17 is a cross section of the locking/unlocking mechanism of FIG. 16 taken along line B-B.
Figure 18:
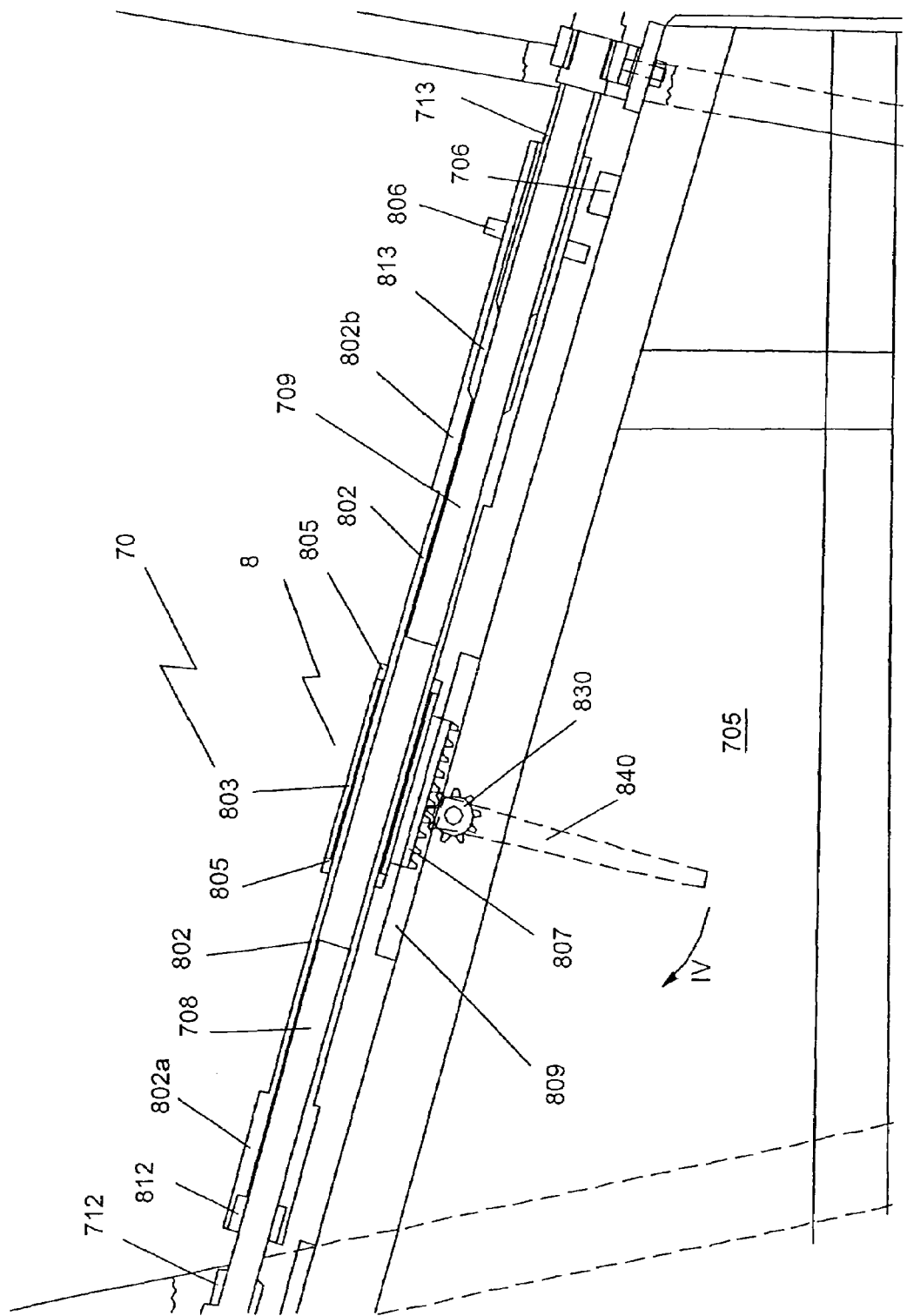
FIG. 18 shows the locking/unlocking mechanism of FIG. 16 in an intermediate mode.

A way of transition between the "controllably tiltable", "free tilting" and "locked" modes of operation of the vehicle 7 will now be described. Referring initially to FIG. 16, when the cog wheel 830 is rotated by rotating the lever 840 in the direction of arrow III, the rack 807 together with the sliding tube 802 are pushed towards the rear of the vehicle 7, and the grooves 812 disengage from the keys 712. This mode is the "free tilting" ("bicycle") mode of operation and is best illustrated in FIG. 18. In this mode, a rotary motion transferred from the steering column 104 via the front gear arrangement 72 causes the front portion 708 of the connecting shaft 70 to rotate freely within the sliding tube 802 without transferring the rotary motion to the rear gear arrangement 74. The rear pinion 732 however is movable about the gear 731, and the driver can tilt the front section 710 of the vehicle 7 using his body weight as described earlier. Upright position of the front section 710 is maintained by a spring mechanism as described with reference to the first embodiment of the vehicle.

Figure 19:
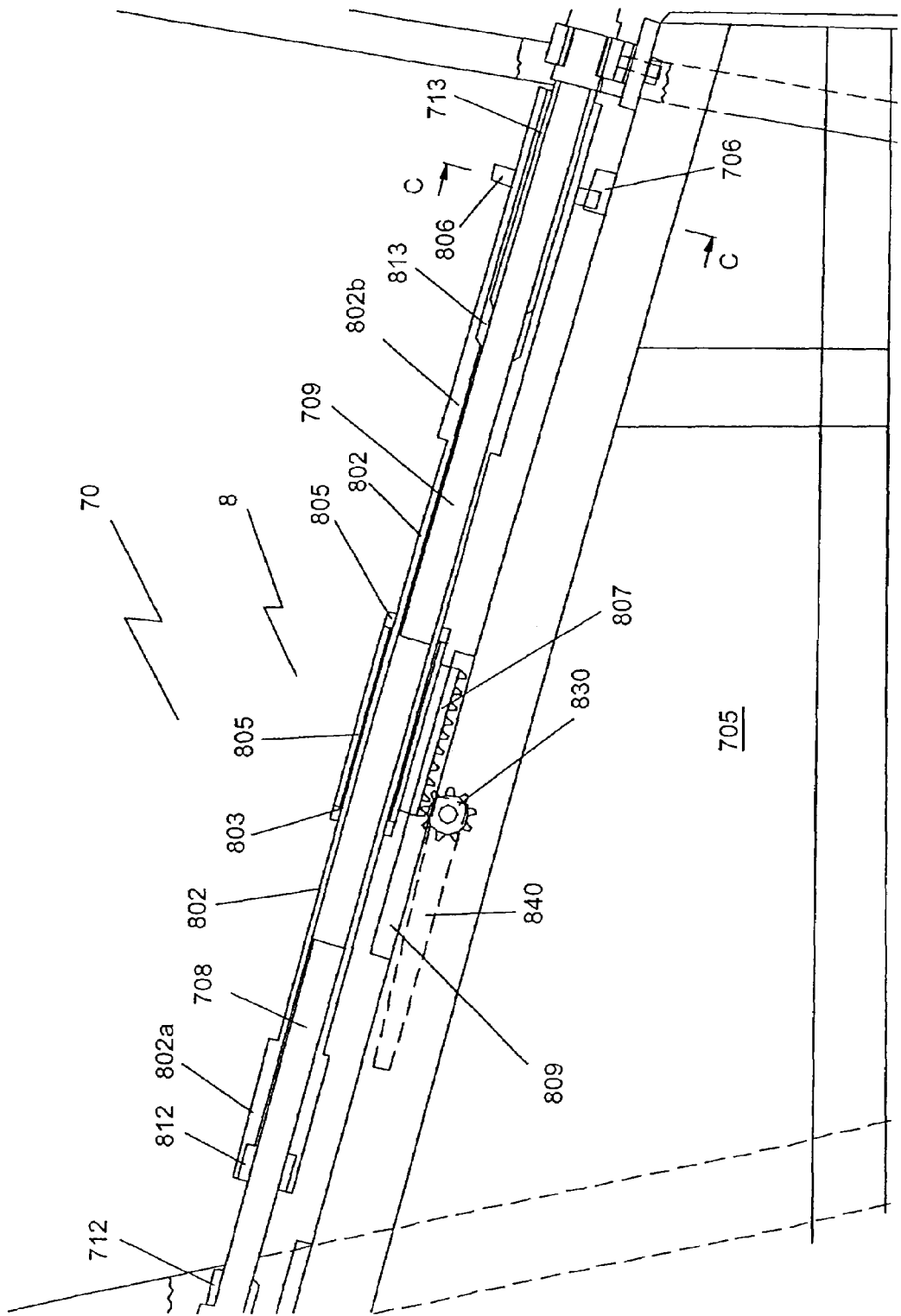
FIG. 19 shows the locking/unlocking mechanism of FIG. 16 in a locked mode.
Figure 20:
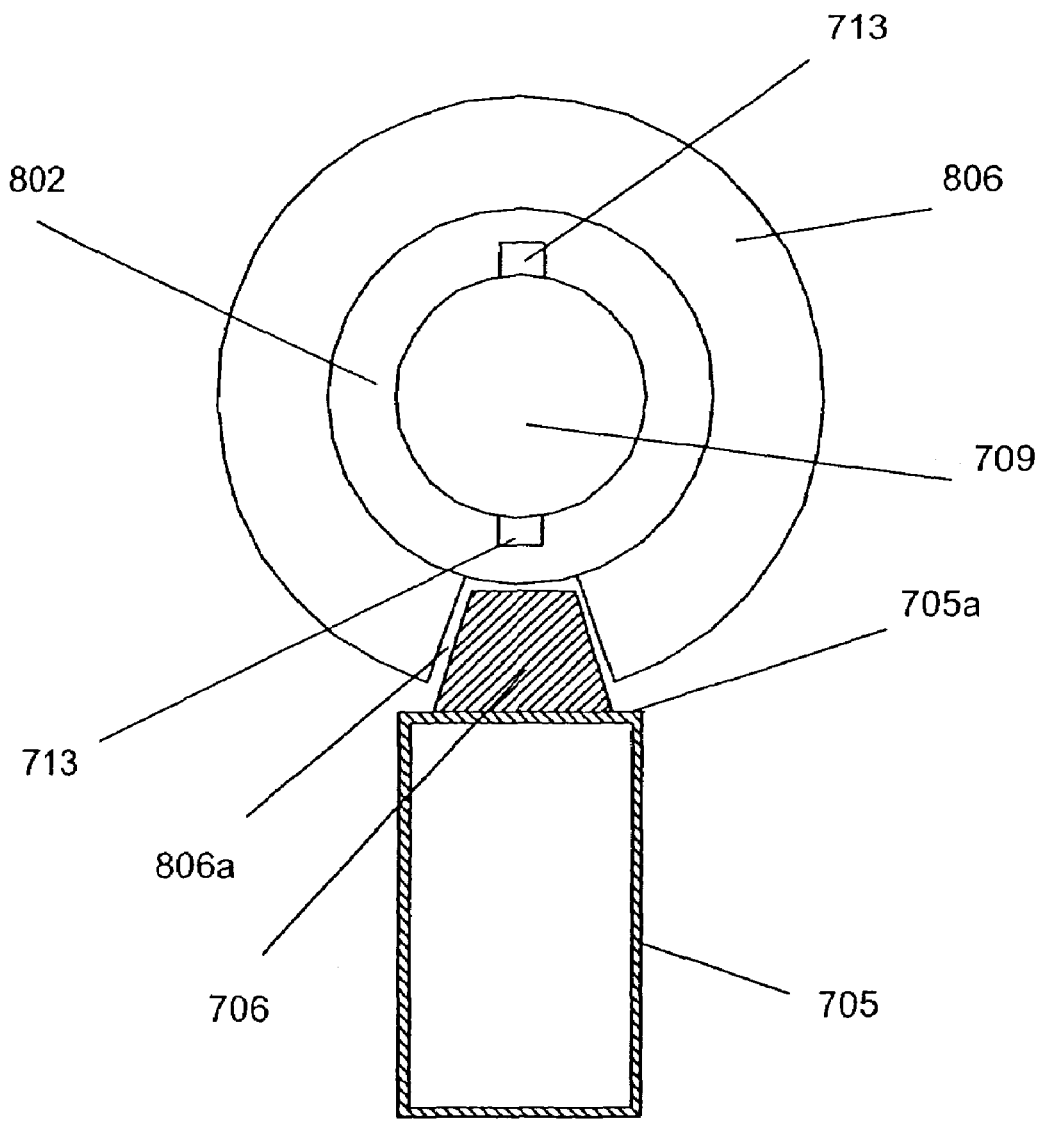
FIG. 20 is a cross section of the locking/unlocking mechanism of FIG. 19 as taken along line C-C.

By rotating the lever 840 in the direction of arrow IV of FIG. 18, the rack 807 together with the sliding tube 802 are pushed further towards the rear section 711 of the vehicle, and the slot 806a of the disk 806 engages with the stop 706. This mode is the "locked" mode of operation of the vehicle in which the front section 710 remains in an upright position regardless whether the vehicle is turning or moving straight. This mode is best illustrated in FIG. 19.

The enablements described in detail above are considered novel over the prior art of record and are considered critical to the operation of at least one aspect of the apparatus and its method of use and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that each named inventor believes that the claimed subject matter is what is intended to be patented.

What is claimed is:

1. A vehicle with three wheels, the vehicle comprising a front section and a rear section, the vehicle being suitable for travelling with the front section leading and the front section being suitable to accommodate at least one rider, and wherein the front section comprises a front frame, a directionally controllable front wheel and an operating means for controlling said front wheel, and the rear section comprises a rear frame and two rear wheels, the rear wheels being spaced apart from each other, the front section of the vehicle being pivotable with respect to the rear section about a pivot axis, the pivot axis being located intermediate the two rear wheels and the pivot axis extending from the rear section towards the front section at an acute angle to the ground, said pivot axis being provided by a pivot means arranged between the front section and the rear section, the pivot means being in communication with a transmission mechanism, the transmission mechanism being releasably connected to the operating means and the transmission mechanism being capable of pivoting the front section about the pivot axis towards the center of the curvature of a turn in accordance with an angle of turn of the front wheel, thus providing greater stability for the vehicle during a turn while the rear section remains in an unchanged position, and wherein a biasing means is provided between the front section and the rear section, the biasing means being operable to assist in returning of the front section of the vehicle into an upright position.

2. A vehicle as claimed in claim 1 wherein the pivot means comprise a pivot bar rotatable within a housing.

3. A vehicle as claimed in claim 2 wherein the pivot bar is fixedly coupled with the front frame and the housing is fixedly coupled with the rear frame.

4. A vehicle as claimed in claim 1 wherein the pivot means are located at an angle to the ground so that the pivot axis extends towards the front wheel and meets a point on the front wheel at which the front wheel touches the ground.

5. A vehicle as claimed in claim 1 wherein the transmission mechanism comprises a connecting shaft extending between the operating means and the rear frame, the transmission means further comprising a first gear pair, said first gear pair arranged between the operating means and the front end of the connecting shaft, the transmission mechanism further comprising a second gear pair, said second gear pair arranged between the rear end of the connecting shall and the rear frame.

6. A vehicle as claimed in claim 1 wherein the operating means comprise a substantially vertical steering column, the steering column being turnable about its longitudinal axis by a handlebar and the steering column being connected to the front wheel so that turning of the steering column results in the front wheel turning in the same direction by a corresponding angle.

7. A vehicle as claimed in claim 6 wherein a connecting shaft is mounted on the front frame by means of at least one support member in which the support member of the connecting shalt is rotatable about its longitudinal axis.

8. A vehicle as claimed in claim 7 wherein the connecting shaft comprises a front portion and a rear portion, and wherein a first gear pair comprises a front gear rigidly coupled with the steering column and a front pinion rigidly coupled with the front portion of the connecting shaft, and wherein a second gear pair comprises a rear gear rigidly coupled with the rear frame and a rear pinion rigidly coupled with the rear portion of the connecting shaft.

9. A vehicle as claimed in claim 6 wherein the rear gear comprises an arcuate cogged surface, said arcuate cogged surface having a central axis, said central axis coinciding with the pivot axis of the vehicle.

10. A vehicle as claimed in claim 1 wherein a release mechanism is provided in the transmission mechanism, the release mechanism being operable to disconnect the transmission mechanism from the operating means thereby preventing the front section from being pivoted about the pivot axis towards the centre of the curvature of the turn in accordance with the angle of turn of the front wheel, the release mechanism being further operable to re-establish the connection between the transmission means and the operating means.

11. A vehicle as claimed in claim 9 wherein the release mechanism is capable of providing an intermediate mode of operation forte vehicle in which the at least one rider can use his body weight for pivoting the front section about the pivot axis.

12. A vehicle as claimed in claim 1 wherein the biasing means is a spring mechanism comprising at least one spring extending between a driver's seat and the rear frame.

* * * * *